United States Patent
Lynch

(10) Patent No.: US 9,891,072 B2
(45) Date of Patent: Feb. 13, 2018

(54) METHOD AND APPARATUS FOR PROVIDING A MAP DISPLAY BASED ON VELOCITY INFORMATION

(71) Applicant: HERE Global B.V., Veldhoven (NL)

(72) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/563,296

(22) Filed: Dec. 8, 2014

(65) Prior Publication Data

US 2016/0161268 A1    Jun. 9, 2016

(51) Int. Cl.
| | | |
|---|---|---|
| *G08G 1/00* | (2006.01) | |
| *G01C 21/36* | (2006.01) | |
| *G01P 3/38* | (2006.01) | |
| *G08G 1/0968* | (2006.01) | |
| *G01C 21/34* | (2006.01) | |

(52) U.S. Cl.
CPC ...... *G01C 21/3694* (2013.01); *B60T 2250/04* (2013.01); *G01C 21/3415* (2013.01); *G01C 21/3461* (2013.01); *G01P 3/38* (2013.01); *G08G 1/096827* (2013.01); *G08G 1/096872* (2013.01)

(58) Field of Classification Search
CPC .................................................. G01C 21/3694
USPC ................... 702/142; 701/400–414, 79, 119, 701/532–544, 535; 340/995.19; 707/609, 707/602–603, E17.005
See application file for complete search history.

(56) References Cited

U.S. PATENT DOCUMENTS

| | | | | |
|---|---|---|---|---|
| 6,574,552 | B2 * | 6/2003 | Yano et al. ................... | 701/414 |
| 6,622,090 | B2 * | 9/2003 | Lin .............................. | 701/472 |
| 8,442,763 | B2 * | 5/2013 | Tuck ..................... | G01C 21/30 |
| | | | | 701/445 |

(Continued)

FOREIGN PATENT DOCUMENTS

| | | | |
|---|---|---|---|
| JP | 2000-285563 | * | 9/2000 |
| WO | PCT/EP09/68048 | * | 9/2011 |

OTHER PUBLICATIONS

Real-Time Vision-Aided Localization and Navigation Based on Three-View Geometry; Indelman, V.; Gurfil, P.; Rivlin, E.; Rotstein, H.; Aerospace and Electronic Systems, IEEE Transactions on; Year: 2012, vol. 48, Issue: 3; pp. 2239-2259, DOI: 10.1109/TAES.2012.6237590.*

(Continued)

*Primary Examiner* — Cuong H Nguyen
(74) *Attorney, Agent, or Firm* — Ditthavong & Steiner, P.C.

(57) ABSTRACT

An approach is provided for presenting comprehensible representation of travel segments based, at least in part, on velocity information. The approach involves processing and/or facilitating a processing of traffic information, velocity information, or a combination thereof for one or more travel segments, characteristic information for one or more vehicles, or a combination thereof to determine the one or more travel segments within a velocity threshold level. The approach also involves causing, at least in part, a filtering of the one or more travel segments based, at least in part, on the velocity threshold level. The approach further involves causing, at least in part, a presentation of at least one mapping user interface depicting one or more representations for the one or more travel segments within the velocity threshold level.

23 Claims, 13 Drawing Sheets

(56) References Cited

U.S. PATENT DOCUMENTS

| | | | | |
|---|---|---|---|---|
| 8,639,654 | B2* | 1/2014 | Vervaet | G01C 21/32 707/602 |
| 8,984,147 | B1* | 3/2015 | Kret et al. | 709/228 |
| 8,989,982 | B2* | 3/2015 | Ohkubo | G01C 21/16 701/400 |
| 9,116,000 | B2* | 8/2015 | Pakzad | G01C 21/206 |
| 9,582,999 | B2* | 2/2017 | Lewis | G08G 1/0112 |
| 2002/0035430 | A1* | 3/2002 | Yano et al. | 701/209 |
| 2011/0117903 | A1* | 5/2011 | Bradley | H04M 1/6075 455/418 |
| 2011/0202266 | A1* | 8/2011 | Downs | G08G 1/0104 701/119 |
| 2011/0241935 | A1* | 10/2011 | Miocinovic | G01C 21/30 342/357.31 |
| 2011/0257885 | A1* | 10/2011 | Tuck | G01C 21/30 701/472 |
| 2012/0197839 | A1* | 8/2012 | Vervaet | G01C 21/32 707/609 |
| 2015/0120174 | A1* | 4/2015 | Lewis | G08G 1/0112 701/118 |
| 2015/0253146 | A1* | 9/2015 | Annapureddy | G01C 21/36 701/490 |

OTHER PUBLICATIONS

RMR: Reliability Map Routing for Tactical Mobile Ad Hoc Networks; Gohari, A.A.; Pakbaz, R.; Melliar-Smith, P.M.; Moser, L.E.; Rodoplu, V.; Selected Areas in Communications, IEEE Journal on; Year: 2011, vol. 29, Issue: 10; pp. 1935-1947, DOI: 10.1109/JSAC.2011.111204.*

Traffic safety effects of navigation systems; Feenstra, P.J.; Hogema, J.H.; Vonk, T.; Intelligent Vehicles Symposium, 2008 IEEE Year: 2008; pp. 1203-1208, DOI: 10.1109/IVS.2008.4621198.*

Improvement of TERCOM aided inertial navigation system by velocity correction; Yoo, Y.M.; Lee, W.H.; Lee, S.M.; Park, C.G.; Kwon, J.H.; Position Location and Navigation Symposium (PLANS), 2012 IEEE/ION; Year: 2012; pp. 1082-1087, DOI: 10.1109/PLANS.2012.6236851.*

GPS integrity monitoring for an intelligent transport system; Tareq Binjammaz; Ali Al-Bayatti; Ashwaq Al-Hargan; Positioning Navigation and Communication (WPNC), 2013 10th Workshop on; Year: 2013; pp. 1-6, DOI: 10.1109/WPNC.2013.6533268.*

Lagrangian sensing: traffic estimation with mobile devices; Daniel B. Work; Olli-Pekka Tossavainen; Quinn Jacobson; Alexandre M. Bayen ; 2009 American Control Conference; Year: 2009; pp. 1536-1543, DOI: 10.1109/ACC.2009.5160332.*

An ensemble Kalman filtering approach to highway traffic estimation using GPS enabled mobile devices; Daniel B. Work; Olli-Pekka Tossavainen; Sebastien Blandin; Alexandre M. Bayen; Tochukwu Iwuchukwu; Kenneth Tracton; 2008 47th IEEE Conference on Decision and Control; Year: 2008; pp. 5062-5068, DOI: 10.1109/CDC.2008.4739016.*

Research on System Design and Control Technology of Vision-Based CyberCar; Wang Rong-ben; Zhang Rong-hui; Jin Li-sheng; Guo Xiu-hong; Guo Lie; 2006 IEEE/RSJ International Conference on Intelligent Robots and Systems; Year: 2006 pp. 3325-3330, DOI: 10.1109/IROS.2006.282507.*

Particle Filter technique for position estimation in GNSS-based localisation systems; Federico Grasso Toro; Damian Eduardo Diaz Fuentes; Debiao Lu; Uwe Becker; Hansjörg Manz; Baigen Cai; 2015 International Association of Institutes of Navigation World Congress (IAIN); Year: 2015; pp. 1-8.*

SeqSLAM: Visual route-based navigation for sunny summer days and stormy winter nights; Michael J. Milford; Gordon. F. Wyeth 2012 IEEE International Conference on Robotics and Automation; Year: 2012; pp. 1643-1649.*

Improvement of inertial sensor based indoor navigation by video content analysis; T. Bernoulli; M. Krammer; U. Walder; U. Dersch; K. Zahn; 2011 International Conference on Indoor Positioning and Indoor Navigation; Year: 2011; pp. 1-9.*

Pose-based SLAM with probabilistic scan matching algorithm using a mechanical scanned imaging sonar; Angelos Mallios; Pere Ridao; Emili Hernandez; David Ribas; Francesco Maurelli; Yvan Petillot; OCEANS 2009—Europe; Year: 2009; pp. 1-6.*

\* cited by examiner

METHOD AND APPARATUS FOR PROVIDING A MAP DISPLAY BASED ON VELOCITY INFORMATION

BACKGROUND

Service providers and device manufacturers (e.g., wireless, cellular, etc.) are continually challenged to deliver value and convenience to consumers by, for example, providing compelling network services. One area of interest has been implementation of sensors-based services (e.g., sensors to detect velocity information for vehicles) and electronic mapping technologies to provide device users with on demand access to navigation services. One problem with the navigational aids is that they present the user with more information than is necessary. As a result, when a map user interface displays every single road segments as colored lines, a user is confused because with the speed of travel the user may be able to take only short occasional glances at the map. Such representation of relevant as well as irrelevant road segments may increase the cognitive load of reading maps for a device user and may be distracting for a given navigational purpose.

SOME EXAMPLE EMBODIMENTS

Therefore, there is a need for an approach for providing comprehensible representation of travel segments based, at least in part, on velocity information.

According to one embodiment, a method comprises processing and/or facilitating a processing of traffic information, velocity information, or a combination thereof for one or more travel segments, characteristic information for one or more vehicles, or a combination thereof to determine the one or more travel segments within a velocity threshold level. The method also comprises causing, at least in part, a filtering of the one or more travel segments based, at least in part, on the velocity threshold level. The method further comprises causing, at least in part, a presentation of at least one mapping user interface depicting one or more representations for the one or more travel segments within the velocity threshold level.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of traffic information, velocity information, or a combination thereof for one or more travel segments, characteristic information for one or more vehicles, or a combination thereof to determine the one or more travel segments within a velocity threshold level. The apparatus is also caused to causing, at least in part, a filtering of the one or more travel segments based, at least in part, on the velocity threshold level. The apparatus is further caused to cause, at least in part, a presentation of at least one mapping user interface depicting one or more representations for the one or more travel segments within the velocity threshold level.

According to another embodiment, a computer-readable storage medium carries one or more sequences of one or more instructions which, when executed by one or more processors, cause, at least in part, an apparatus to process and/or facilitate a processing of traffic information, velocity information, or a combination thereof for one or more travel segments, characteristic information for one or more vehicles, or a combination thereof to determine the one or more travel segments within a velocity threshold level. The apparatus is also caused to cause, at least in part, a filtering of the one or more travel segments based, at least in part, on the velocity threshold level. The apparatus is further caused to cause, at least in part, a presentation of at least one mapping user interface depicting one or more representations for the one or more travel segments within the velocity threshold level.

According to another embodiment, an apparatus comprises means for processing and/or facilitating a processing of traffic information, velocity information, or a combination thereof for one or more travel segments, characteristic information for one or more vehicles, or a combination thereof to determine the one or more travel segments within a velocity threshold level. The apparatus also comprises means for causing, at least in part, a filtering of the one or more travel segments based, at least in part, on the velocity threshold level. The apparatus further comprises means for causing, at least in part, a presentation of at least one mapping user interface depicting one or more representations for the one or more travel segments within the velocity threshold level.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing comprehensible representation of travel segments based, at least in part, on velocity information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
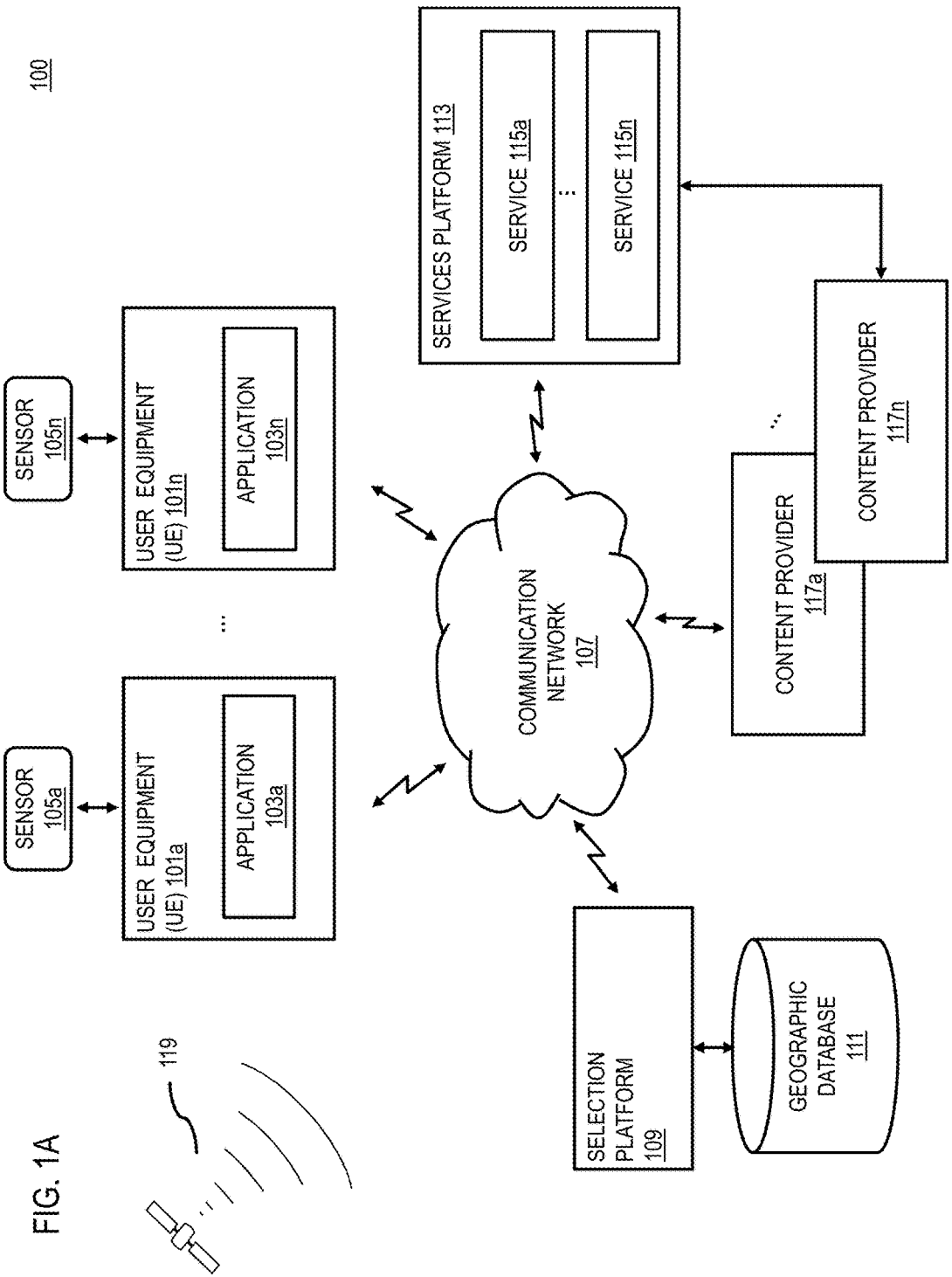
FIG. 1A is a diagram of a system capable of providing comprehensible representation of travel segments based, at least in part, on velocity information, according to one embodiment.

FIG. 1A is a diagram of a system capable of providing comprehensible representation of travel segments based, at least in part, on velocity information, according to one embodiment. Navigational services are useful to assist the driver of a vehicle in locating his/her current position and for locating and moving towards a desired destination. Typically, the navigational services provide conventional map display for a geographical area. Such conventional map provides the driver with excessive information thereby confusing them, for example, every single travel segments (e.g., interstate highways, state highways, major roads, access roads, local streets, etc.) are highlighted. Such unnecessary information is presented to the user, despite the fact that the user only requires information on relevant travel segments to his/her destination. The presentation of irrelevant travel segments may interfere with the viewing of the relevant travel segments and may be distracting for a given navigational purpose.

To address this problem, a system 100 of FIG. 1 introduces the capability to provide a map display based on characteristics of the travel segments, for example, velocity information. The system 100 may use velocity sensing (e.g., GPS, accelerometer) and electronic mapping technologies to provide navigation services, including the provision of link-based traffic flow representation of travel segments based on velocity information. In one scenario, the system 100 may determine average speed information for one or more travel segments (e.g., high function road (roads with high speed threshold), low function road (roads with low speed threshold)). The system 100 may also determine speed information for at least one vehicle travelling in a travel segment. In one example embodiment, at least one vehicle may be travelling east at the rate of 60 miles per hour. Then, the system 100 may represent one or more road segments whose speed limit is similar to that of the vehicle (i.e., 60 miles per hour). The selected road segments may be shown bigger and larger above other roads because these are the road segments of user's interest. In one embodiment, the system 100 changes the emphasis on individual road segments based on the matching of attributes between the road segments and at least one vehicle. In one scenario, velocity information need not necessarily be how fast a vehicle is travelling at a particular direction, for example, if a user has entered a route towards a particular destination, the system 100 may determine travel segments that best fits the performance of the vehicle.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a selection platform 109 via the communication network 107.

In one embodiment, the selection platform 109 performs one or more functions associated with providing comprehensible representation of travel segments based, at least in part, on velocity information.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as mapping application (e.g., link-based traffic flow representation of travel segments based on velocity information), location-based service applications, navigation applications, content provisioning services, camera/imaging application, media player applications, social networking applications, calendar applications, and the like. In one embodiment, one of the applications 103 at the UE 101 may act as a client for the selection platform 109 and perform one or more functions associated with the functions of the selection platform 109 by interacting with the selection platform 109 over the communication network 107.

By way of example, the sensors 105 may be any type of sensor. In certain embodiments, the sensors 105 may include, for example, a global positioning sensor for gathering location data (e.g., GPS may provide information on the difference between the past and the current position for at least one vehicle), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one vehicle and/or at least one UE 101 associated with the at least one vehicle. In another example embodiment, the engine torque information and sensor information may be used to estimate deceleration and acceleration of a vehicle (e.g., brake pressure and the like).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the selection platform 109 may be a platform with multiple interconnected components. The selection platform 109 may include multiple servers, intelligent networking devices, computing devices, components and corresponding software for providing comprehensible representation of travel segments based, at least in part, on velocity information. In addition, it is noted that the selection platform 109 may be a separate entity of the system 100, a part of the one or more services 115a-115n (collectively referred to as services 115) of the services platform 113, or included within the UE 101 (e.g., as part of the applications 103).

In one embodiment, the selection platform 109 may process and/or facilitate a processing of traffic information, velocity information, or a combination thereof for one or more travel segments, characteristic information for one or more vehicles, or a combination thereof to determine the one or more travel segments within a velocity threshold level. In one scenario, at least one travel segment includes multiple lane level segments wherein each lane is assigned different thresholds. In one scenario, the selection platform 109 may determine speed limit information, congestion information, accident information, or a combination thereof for one or more travel segments. The selection platform 109 may determine characteristic information for one or more vehicles. The characteristic information includes, at least in part, vehicle acceleration information, vehicle deceleration information, vehicle velocity information, vehicle capability information, or a combination thereof. Then, the selection platform 109 may compare the determined information for the one or more travel segments and the one or more vehicles to cause a matching.

In one embodiment, the selection platform 109 may cause, at least in part, a filtering of the one or more travel segments based, at least in part, on the velocity threshold level. In one scenario, the selection platform 109 may cause a matching of velocity information associated with one or more travel segments with the velocity information of one or more moving vehicles. Then, the selection platform 109 may filter one or more travel segments based, at least in part, on the matching. In one scenario, the selection platform 109 may store and/or access information on one or more travel segments from the database 111. The selection platform 109 may cause an association between the current vehicle dynamics and the travel segment information, for example, if a vehicle is driving at a fast speed, then the selection platform 109 may display travel segment with similar velocity information.

In one embodiment, the selection platform 109 may cause, at least in part, a presentation of at least one mapping user interface depicting one or more representations for the one or more travel segments within the velocity threshold level. The one or more travel segments within the velocity threshold level correspond to the velocity information of the one or more moving vehicles. In one scenario, the one or more representation of the filtered travel segments includes a panning, a highlighting, a raising, a thickening, or a combination thereof.

In one embodiment, the geographic database 111 may store attributes (e.g., velocity information, dimension information, etc.) for one or more travel segments. In another embodiment, the geographic database 111 may store characteristic information for one or more vehicles. The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the selection platform 109 and the content provider 117 to supplement or aid in the processing of the content information.

By way of example, the services 115 may be an online service that reflects interests and/or activities of users. The services 115 allow users to share location information (e.g., speed information), activities information (e.g., travel plans), contextual information, historical user information and interests within their individual networks, and provides for data portability. The services 115 may additionally assist in providing the selection platform 109 with information on travel plans of at least one user, activity information for at least one user in at least one location, speed information for at least one user, user profile information, and a variety of additional information.

The content providers 117a-117n (collectively referred to as content provider 117) may provide content to the UE 101, the selection platform 109, and the services 115 of the services platform 113. The content provided may be any type of content, such as, image content (e.g., maps), textual content, audio content, video content, etc. In one embodiment, the content provider 117 may provide content that may supplement content of the applications 103, the sensors 105, or a combination thereof. By way of example, the content provider 117 may provide content that may aid in presenting comprehensible representation of travel segment information. In one embodiment, the content provider 117 may also store content associated with the UE 101, the selection platform 109, and the services 115 of the services platform 113. In another embodiment, the content provider 117 may manage access to a central repository of data, and offer a consistent, standard interface to data, such as, a repository of attributes for one or more travel segments, traffic information, speed limit information in at least one travel segment, or a combination thereof. Any known or still developing methods, techniques or processes for presenting comprehensible representation of travel segment information may be employed by the selection platform 109.

By way of example, the UE 101, the selection platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
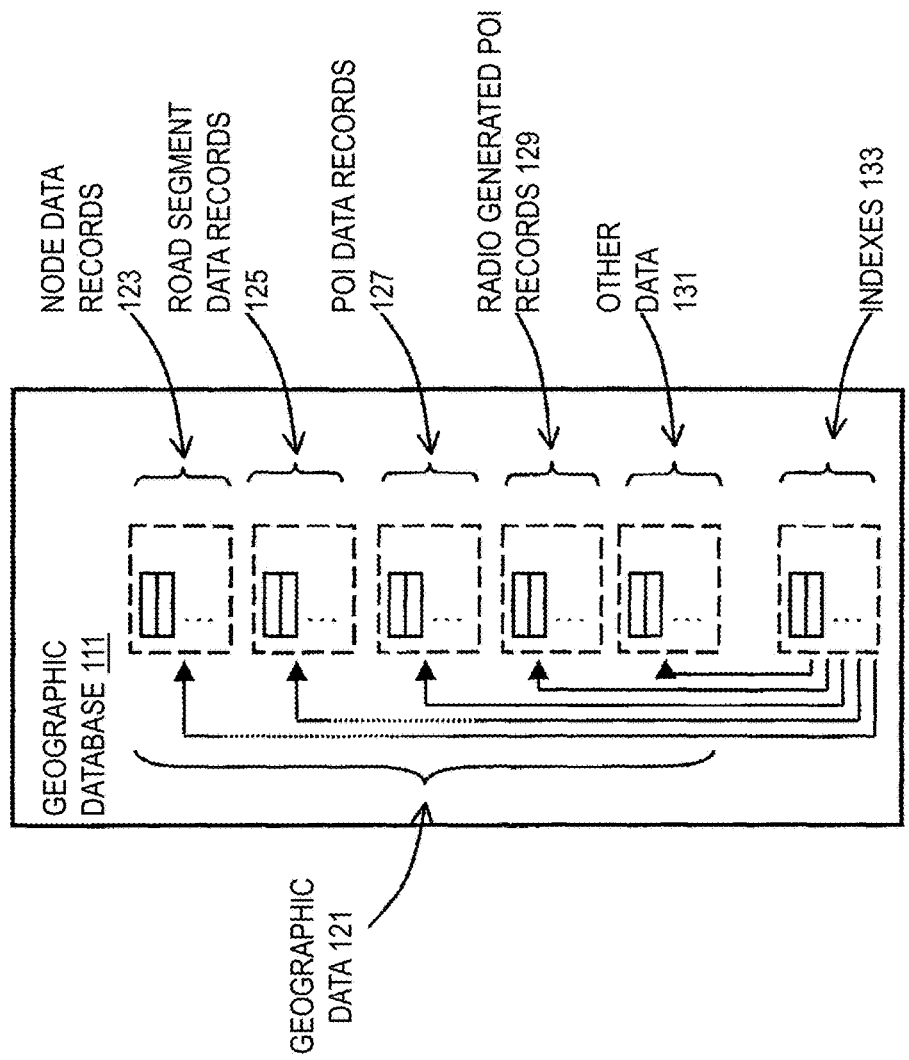
FIG. 1B is a diagram of the geographic database 111 of system 100, according to exemplary embodiments.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, radio generated POI records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include data from radio advertisements associated with the POI data records 127 and their respective locations in the radio generated POI records 129. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, traffic map display for only relevant travel segments.

Figure 2:
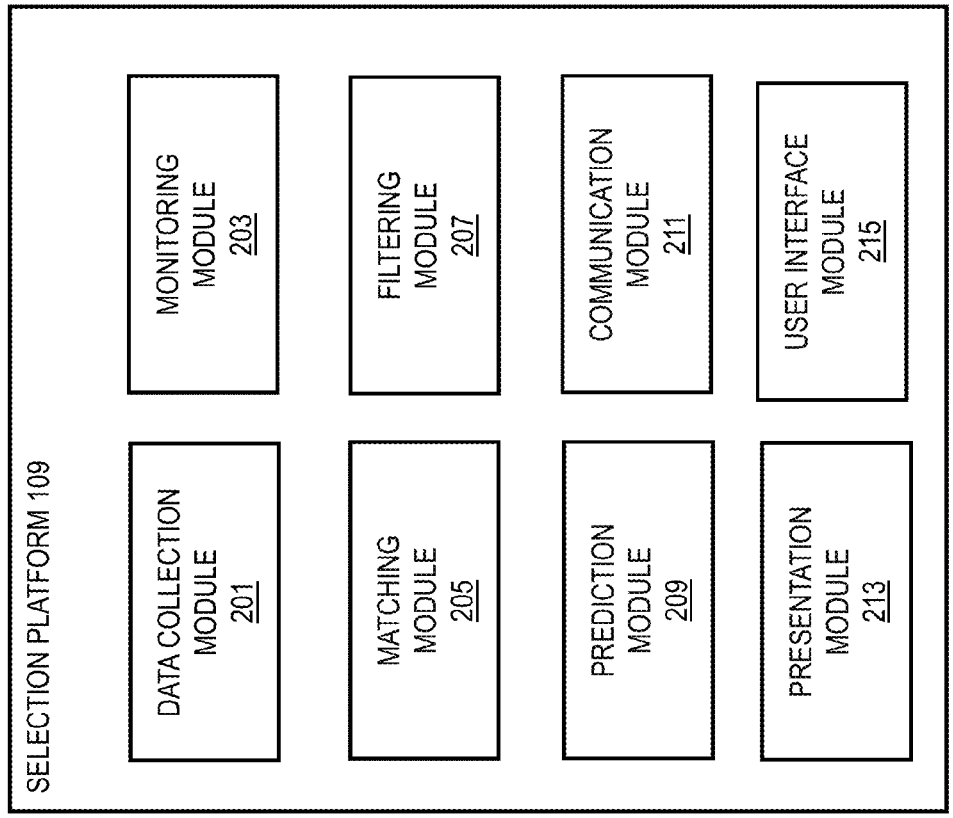
FIG. 2 is a diagram of the components of the selection platform 109, according to one embodiment.

FIG. 2 is a diagram of the components of the selection platform 109, according to one embodiment. By way of example, the selection platform 109 includes one or more components for providing comprehensible representation of travel segments based, at least in part, on velocity information. It is contemplated that the functions of these components may be combined in one or more components or performed by other components of equivalent functionality. In this embodiment, the selection platform 109 includes a data collection module 201, a monitoring module 203, a matching module 205, a filtering module 207, a prediction module 209, a communication module 211, a presentation module 213, and a user interface module 215.

In one embodiment, the data collection module 201 may accumulate traffic information, velocity information, or a combination thereof for one or more travel segments. In another scenario, the data collection module 201 may collect characteristic information for one or more vehicles travelling in at least one travel segment. The characteristic information includes, at least in part, vehicle acceleration information, vehicle deceleration information, vehicle velocity information, vehicle capability information, or a combination thereof.

In one embodiment, the monitoring module 203 may monitor velocity information for at least one vehicle, at least one device associated with at least one vehicle, or a combination thereof in real-time, periodically, according to schedule, on demand, or a combination thereof. In another embodiment, the monitoring module 203 may monitor traffic information (e.g., congestion level), velocity information, or a combination thereof for one or more travel segments in real-time, periodically, according to schedule, on demand, or a combination thereof.

In one embodiment, the matching module 205 may compare the velocity information of at least one vehicle travelling in a road segment with the velocity information of the one or more other road segments. In another embodiment, the matching module 205 may receive traffic information from the monitoring module 203, other characteristic information (e.g., vehicle acceleration information, vehicle deceleration information, vehicle capability information etc.) for one or more vehicles from the data collection module 201. Then, the matching module 205 may analyze the received information to determine a perfect matching.

In one embodiment, the filtering module 207 may filter one or more travel segments based, at least in part, on the matching. The one or more filtered travel segments are then transmitted to the presentation module 213 and the user interface module 215 via the communication module 211.

In one embodiment, the prediction module 209 may predict at least one travel segment based, at least in part, on the contextual information, the location information, the historical activity data, or a combination thereof for one or more vehicles. In one scenario, the prediction module 209 may obtain historical activity data for at least one user from the location database 111 (e.g., travel path for at least one user driving home from work). In another scenario, the prediction module 209 may predict a travel segment based on speed information for at least one vehicle (e.g., predicting travel segments with speed limits that correspond to the speed of the vehicle). In a further scenario, the prediction module 209 may predict one or more travel segments based, at least in part, on the location information of at least one vehicle (e.g., estimate travel route based on the proximity of a vehicle to a travel segment combined with speed information).

In one embodiment, the communication module 211 may cause, at least in part, a transmission of at least one communication from the selection platform 109 to the one or more vehicles and/or UE 101s associated with the vehicles, or vice versa. Certain communications can be via methods such as an internet protocol, messaging (e.g., SMS, MMS, etc.), or any other communication method (e.g., via the communication network 107). The communication module 211 may be used to communicate commands, requests, data, etc. In one example embodiment, a vehicle and/or UE 101 associated with a vehicle can send a request to the selection platform 109 via the communication module 211, and the selection platform 109 may then send a response back via the communication module 211. In another embodiment, the communication module 211 may be used for communication between the various modules (i.e. 201-215). The communication module 211 executes various protocols and data sharing techniques for connecting at least one vehicle and/or UE 101 associated with a vehicle with the selection platform 109.

In one embodiment, the presentation module 213 obtains a set of summary statistics from other modules, and continues with providing a presentation of a traffic map representing one or more matched and filtered travel segments. The traffic map includes travel segments that match the velocity information of at least one travelling vehicle. In another embodiment, the presentation module 213 may cause a presentation of matched and filtered travel segments based, at least in part, on data density information, network information, or a combination thereof. In a further embodiment, the presentation module 213 may cause a presentation of matched and filtered travel segments based on time-based information, routing information, preference information, or a combination thereof.

In one embodiment, the user interface module 215 employs various application programming interfaces (APIs) or other function calls corresponding to the applications 103 of the UE 101, thus enabling the display of graphics primitives such as maps, menus, data entry fields, etc., for generating the user interface elements. By way of example, the user interface module 215 generates the interface in response to APIs or other function calls corresponding to the browser application of the UE 101, thus enabling the display of graphics primitives. In another embodiment, the user interface module 215 may cause a presentation of one or more matched and filtered travel segments in at least one user interface element of a user interface, wherein the representation of the matched and filtered travel segments include, at least in part, a panning, a highlighting, a raising, a thickening, or a combination thereof.

The above presented modules and components of the selection platform 109 can be implemented in hardware, firmware, software, or a combination thereof. Though depicted as a separate entity in FIG. 1A, it is contemplated that the selection platform 109 may be implemented for direct operation by respective UE 101s. As such, the selection platform 109 may generate direct signal inputs by way of the operating system of the UE 101 for interacting with the applications 103. In another embodiment, one or more of the modules 201-215 may be implemented for operation by respective UE 101s, as a selection platform 109, or combination thereof. Still further, the selection platform 109 may be integrated for direct operation with the services 115, such as in the form of a widget or applet, in accordance with an information and/or subscriber sharing arrangement. The various executions presented herein contemplate any and all arrangements and models.

Figure 3:
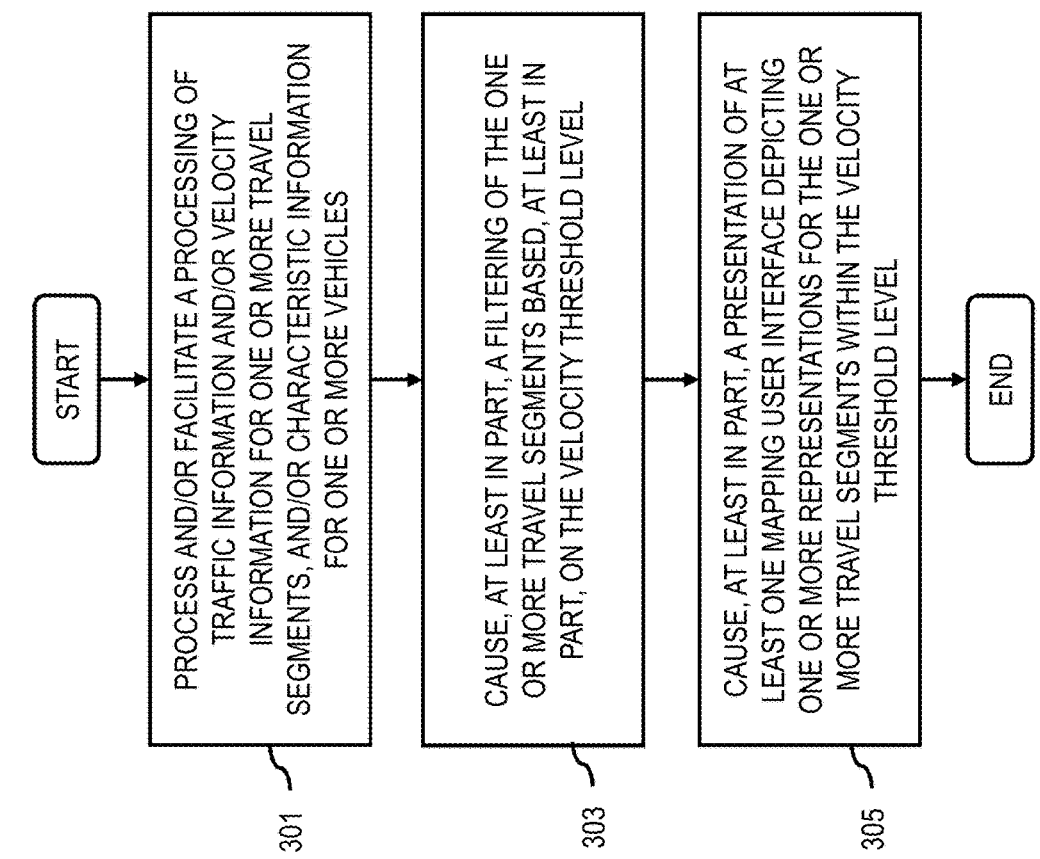
FIG. 3 is a flowchart of a process for selecting and presenting travel segments based, at least in part, on the velocity threshold level, according to one embodiment.
Figure 11:
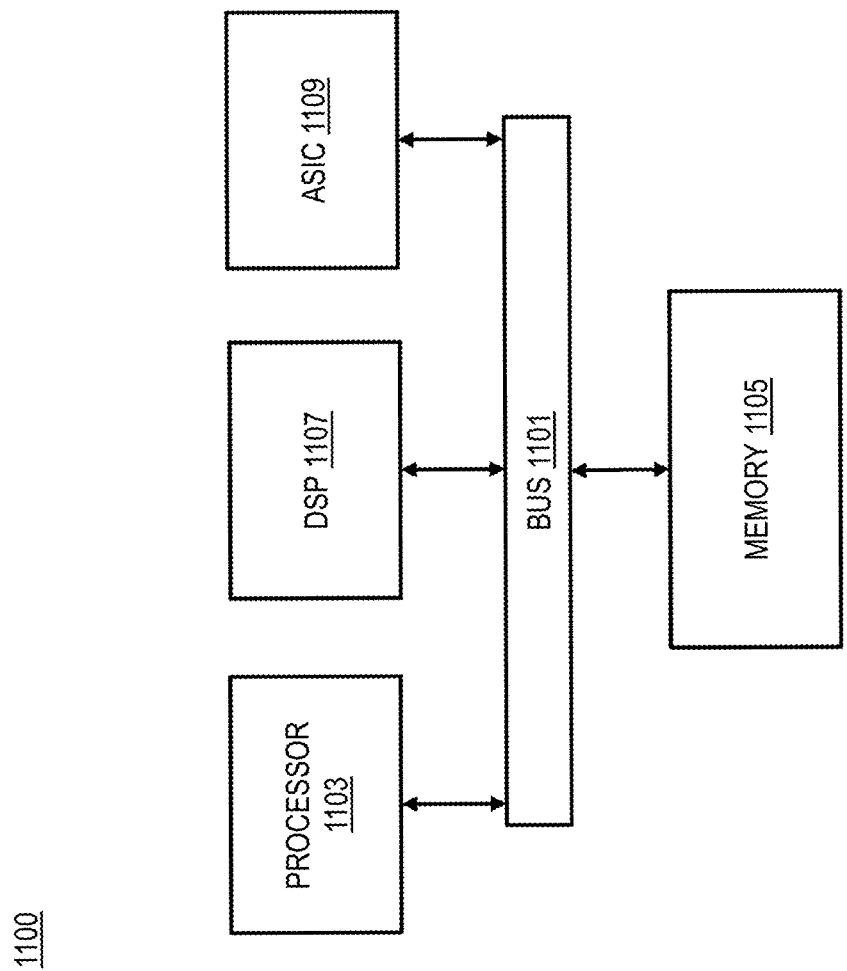
FIG. 11 is a diagram of a chip set that can be used to implement an embodiment of the invention.

FIG. 3 is a flowchart of a process for selecting and presenting travel segments based, at least in part, on the velocity threshold level, according to one embodiment. In one embodiment, the selection platform 109 performs the process 300 and is implemented in, for instance, a chip set including a processor and a memory as shown in FIG. 11.

In step 301, the selection platform 109 may process and/or facilitate a processing of traffic information, velocity information, or a combination thereof for one or more travel segments, characteristic information for one or more vehicles, or a combination thereof to determine the one or more travel segments within a velocity threshold level. In one embodiment, the velocity information includes, at least in part, historical velocity information, real-time average velocity information, or a combination thereof. In one scenario, the historical velocity information includes, at least in part, speed limit information for one or more travel segments over a specific time period, speed information for one or more vehicles over a particular time period, or a combination thereof. In another scenario, the average velocity information includes, at least in part, the average of speed limit in one or more travel segments, the average of rate of speed for one or more vehicles, or a combination thereof. In another embodiment, the characteristic information includes, at least in part, vehicle acceleration information, vehicle deceleration information, vehicle velocity information, vehicle capability information, or a combination thereof. In one scenario, vehicle acceleration and/or vehicle deceleration information may represent maximum vehicle capabilities (e.g., rate of change in acceleration, maximum speed etc.) as well as the driver's behavior. Further, vehicle acceleration and/or vehicle deceleration information may depend upon the type of vehicle (e.g., its size, weight, engine power etc.). In a further embodiment, the velocity threshold level include one or more travel segments that conform to the velocity information for at least one vehicle, at least one device associated with at least one vehicle, or a combination thereof.

In step 303, the selection platform 109 may cause, at least in part, a filtering of the one or more travel segments based, at least in part, on the velocity threshold level. In one embodiment, the basic filtering categorizes one or more travel segments that are of similar velocity. In one example embodiment, the selection platform 109 may pick multiple travel segments that match the velocity information of a travelling vehicle, for example, if a car is travelling west at the rate of 50 miles per hour, then the selection platform 109 may choose travel segments with velocity information that is similar to that of the car. In one scenario, one or more filtered travel segments may have similar dimensions, similar speed threshold, or a combination thereof. In another embodiment, the process of filtering may include assignment of a weight based on the velocity threshold level. Such assignment ensures that the process is not just binary but also provides a continuous variation, for example, the further the threshold velocity, the smaller the road representation.

In step 305, the selection platform 109 may cause, at least in part, a presentation of at least one mapping user interface depicting one or more representations for the one or more travel segments within the velocity threshold level. In one embodiment, the one or more representations include, at least in part, a panning, a highlighting, a raising, a thickening, or a combination thereof of the one or more travel segments. In one scenario, the selected and filtered travel segments may be highlighted and may have an enlarged view over the irrelevant travel segments. In one example embodiment, a vehicle travelling in a local road with lower velocity level may be presented with other road segments with lower speed limits. The selected road segments with lower speed limits may be highlighted or protruded. Subsequently, when the vehicle enter a highway then the selection platform 109 may predict that the user is going to travel fast henceforth may cause a display of road segments with higher speed limit. In another scenario, at least one travel segment includes multiple lane level segments wherein each lane is assigned different thresholds. The one or more representation may include a lane level display such that each lane may be displayed differently, for example, the selection platform 109 may de-emphasize exit lanes when a user is driving at a high velocity, even though it is part of the same road segments. In a further scenario, when a vehicle is travelling at a high velocity, only the current lane may be fully displayed whilst other lanes on the road may be de-emphasized.

Figure 4:
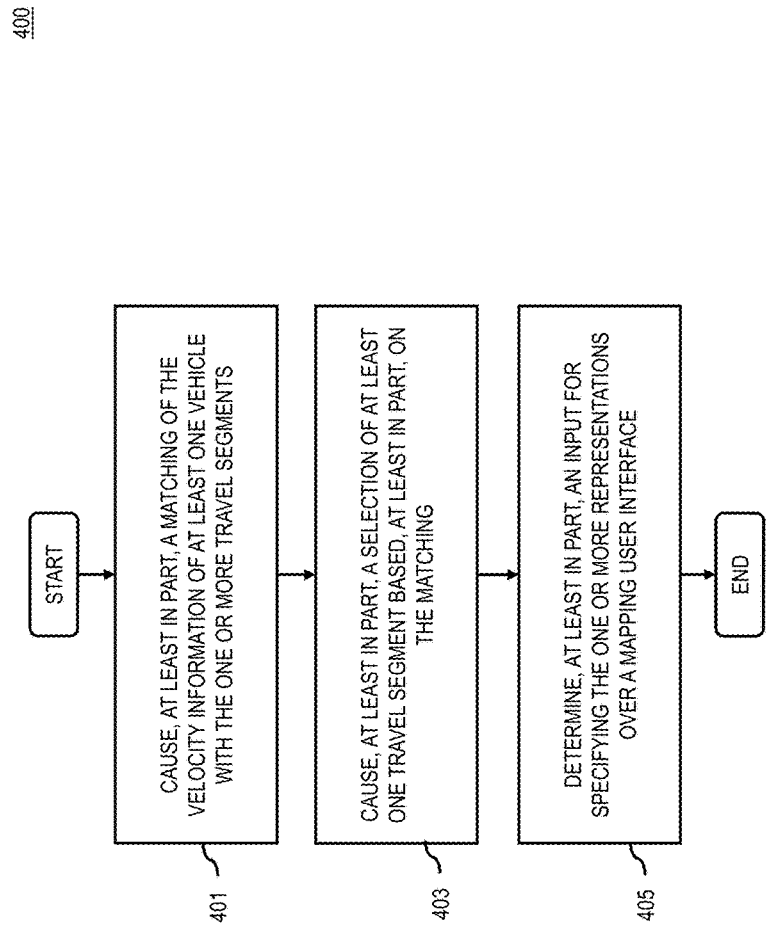
FIG. 4 is a flowchart of a process for selecting at least one travel segment based, at least in part, on the matched velocity information for presentation over a mapping user interface, according to one embodiment.

FIG. 4 is a flowchart of a process for selecting at least one travel segment based, at least in part, on the matched velocity information for presentation over a mapping user interface, according to one embodiment. In one embodiment, the selection platform 109 performs the process 400 and is implemented in, for instance, a chip set including a processor and a memory as shown in FIG. 11.

In step 401, the selection platform 109 may cause, at least in part, a matching of the velocity information of at least one vehicle with the one or more travel segments. In one scenario, the sensors 105 may measure the speed and/or direction at which at least one vehicle is moving. The velocity is direction aware and refers to the rate at which an object changes its position. In one example embodiment, a bus is travelling south at the speed of 60 miles per hour. The velocity information for the bus is 60 miles per hour south. Then, the selection platform 109 may match the velocity information of road segments with the velocity information of the bus.

In step 403, the selection platform 109 may cause, at least in part, a selection of at least one travel segment based, at least in part, on the matching. In one scenario, the selection platform 109 may match velocity information (e.g., 60 miles per hour east) for one or more road segments and the at least one travelling vehicle (e.g., 60 miles per hour east). Then, the selection platform 109 may filter the matched travel segments from the numerous travel segments.

In step 405, the selection platform 109 may determine, at least in part, an input for specifying the one or more representations over a mapping user interface, wherein at least one input include the matched velocity information. In one scenario, the selection platform 109 may cause a panning, a highlighting, a raising, a thickening, or a combination thereof of the filtered travel segments based, at least in part, on the matched velocity information. In one example embodiment, one or more road segments with matched velocity information may be raised and enlarged whereas the unrelated travel segments may be blurred and/or minimized. In another example embodiment, the selection platform 109 may have its own set of rules to identify touch based interaction and/or gesture based interaction for panning one or more travel segments. In a further scenario, the selection platform 109 may assign a weight to each travel segment so that the interface may be shown as a continuous variation in terms of scale and/or color and/or height etc.

Figure 5:
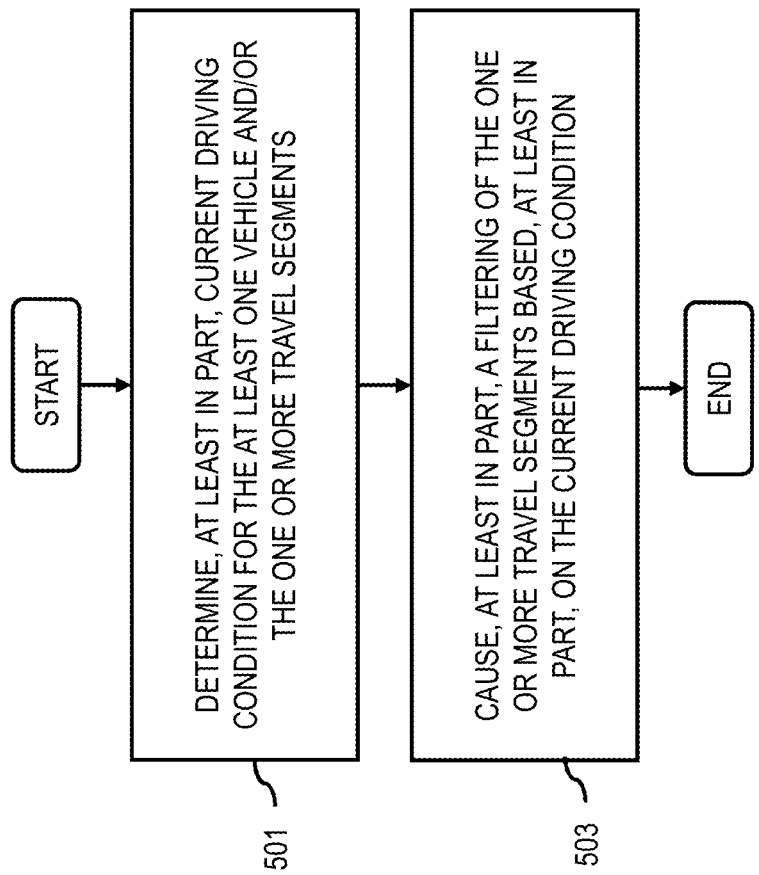
FIG. 5 is a flowchart of a process for causing a selection of one or more travel segments based, at least in part, on current driving condition for the at least one vehicle, the one or more travel segments, or a combination thereof, according to one embodiment.

FIG. 5 is a flowchart of a process for causing a selection of one or more travel segments based, at least in part, on current driving condition for the at least one vehicle, the one or more travel segments, or a combination thereof, according to one embodiment. In one embodiment, the selection platform 109 performs the process 500 and is implemented in, for instance, a chip set including a processor and a memory as shown in FIG. 11.

In step 501, the selection platform 109 may determine, at least in part, current driving condition for the at least one vehicle, the one or more travel segments, or a combination thereof, wherein the current driving condition include speed information, real-time traffic information, or a combination thereof. In one scenario, the selection platform 109 may determine speed information, direction information, capability information, or a combination thereof for one or more travelling vehicles. In another scenario, the selection platform 109 may determine traffic information in real-time (e.g., congestion level) and/or speed limit for one or more travel segments. In one scenario, the posted speed limit for at least one travel segment may be based on the real-time traffic data of the travel segment.

In step 503, the selection platform 109 may cause, at least in part, a filtering of the one or more travel segments based, at least in part, on the current driving condition. In one scenario, the selection platform may select one or more travel segments that matches the current driving condition (e.g., speed information, direction information etc.) of one or more vehicles. In another scenario, the selection platform 109 may monitor the performance of a vehicle in real-time (e.g., vehicle velocity, vehicle acceleration, vehicle deceleration, steering, etc.). Then, the selection platform 109 may display a map based on the monitoring. For example, the selection platform 109 may display travel segments where users are accelerating or decelerating.

Figure 6:
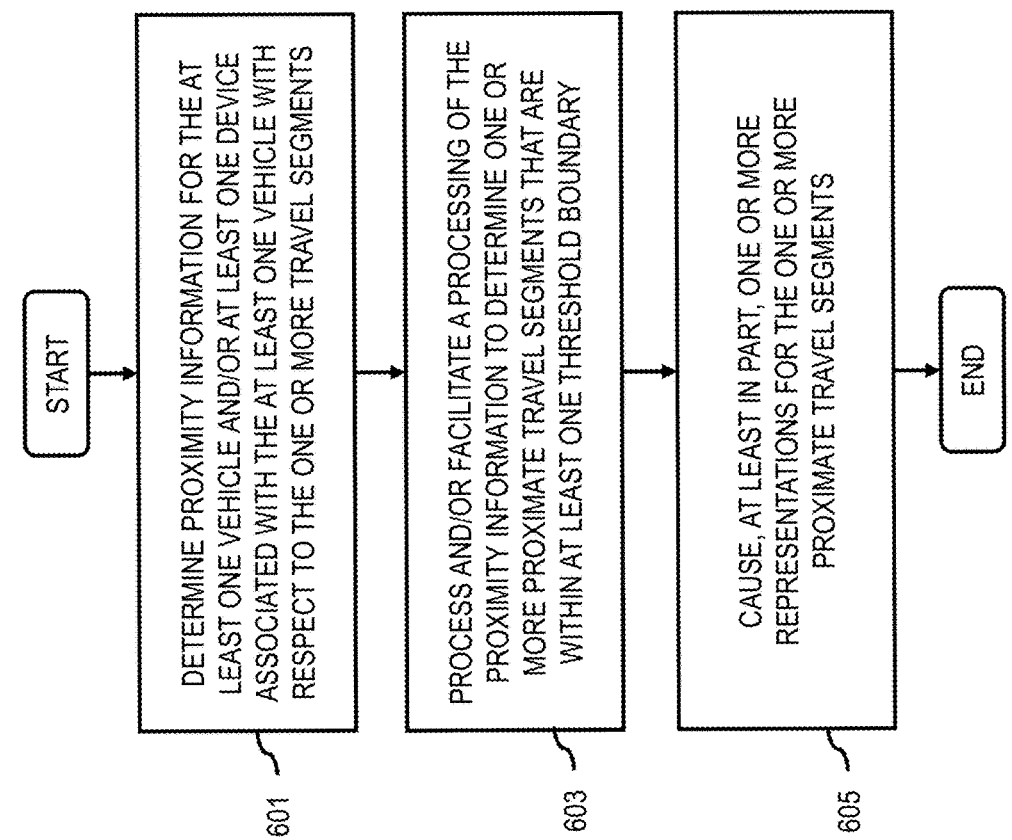
FIG. 6 is a flowchart of a process for causing one or more representation of travel segments based, at least in part, on proximity information of at least one vehicle, at least one device associated with at least one vehicle, or a combination thereof, according to one embodiment.

FIG. 6 is a flowchart of a process for causing one or more representation of travel segments based, at least in part, on proximity information of at least one vehicle, at least one device associated with at least one vehicle, or a combination thereof, according to one embodiment. In one embodiment, the selection platform 109 performs the process 600 and is implemented in, for instance, a chip set including a processor and a memory as shown in FIG. 11.

In step 601, the selection platform 109 may determine proximity information for the at least one vehicle, at least one device associated with the at least one vehicle, or a combination thereof with respect to the one or more travel segments. In one scenario, the selection platform 109 may receive geographic coordinates for a vehicle and/or UE 101 associated with a vehicle in one or more travel segments via sensors 105 and/or satellites 119.

In step 603, the selection platform 109 may process and/or facilitate a processing of the proximity information to determine one or more proximate travel segments that are within at least one threshold boundary from the at least one vehicle, the at least one device associated with at least one vehicle, or a combination thereof. In one scenario, the selection platform 109 may determine one or more travel segments based on their proximity from at least one vehicle, at least one device associated with at least one vehicle, or a combination thereof.

In step 605, the selection platform 109 may cause, at least in part, one or more representations for the one or more proximate travel segments. In one scenario, the selection platform 109 may cause a panning, a highlighting, a raising, a thickening, or a combination thereof of the one or more proximate travel segments. In another scenario, one or more matched travel segments that is proximate to a vehicle may be layered over the other travel segments.

Figure 7:
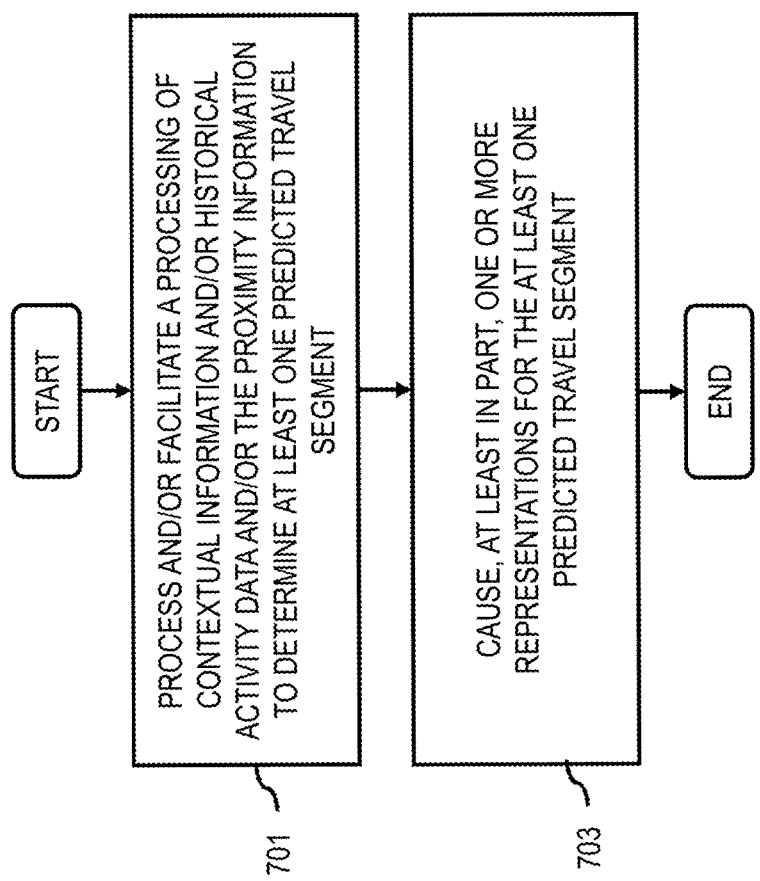
FIG. 7 is a flowchart of a process for causing one or more representations of the at least one predicted travel segment, according to one embodiment.

FIG. 7 is a flowchart of a process for causing one or more representations of the at least one predicted travel segment, according to one embodiment. In one embodiment, the selection platform 109 performs the process 700 and is implemented in, for instance, a chip set including a processor and a memory as shown in FIG. 11.

In step 701, the selection platform 109 may process and/or facilitate a processing of contextual information, historical activity data, the proximity information, or a combination thereof for the at least one vehicle, the at least one device associated with at least one vehicle, or a combination thereof to determine at least one predicted travel segment. In one scenario, the contextual information includes, at least in part, location information, time-based information, traffic information, or a combination thereof. In another scenario, historical activity data include activity information (e.g., past routes, travel history, speed history, etc.) for at least one vehicle. The selection platform 109 may process contextual information and/or historical activity data and/or proximity information to determine a road segment a user is likely to traverse as the next step (e.g., within the next 5 minutes, 10 minutes, etc.).

In step 703, the selection platform 109 may cause, at least in part, one or more representations for the at least one predicted travel segment. In one scenario, the selection platform 109 may cause a panning, a highlighting, a raising, a thickening, or a combination thereof of the one or more predicted travel segments.

Figure 8:
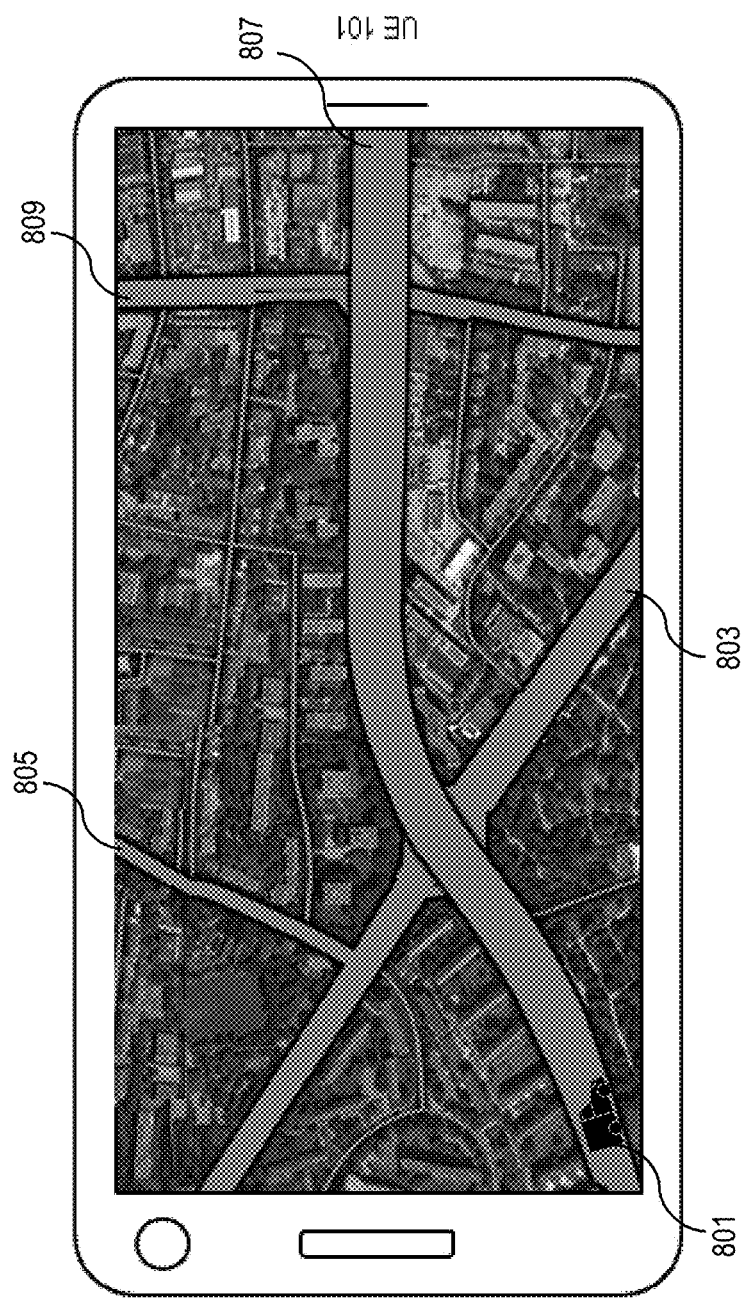
FIG. 8 is a user interface diagram that represents a scenario wherein travel segments with higher speed limits that conforms to the speed of at least one vehicle is displayed, according to one example embodiment.

FIG. 8 is a user interface diagram that represents a scenario wherein travel segments with higher speed limits that conforms to the speed of at least one vehicle is displayed, according to one example embodiment. In one scenario, the selection platform 109 may determine current speed for vehicle 801. The vehicle 801 may be travelling west at the speed of 70 miles per hour. Then, the selection platform 109 may filter one or more travel segments with speed limit that corresponds to the speed of vehicle 801. Since vehicle 801 is travelling west at the speed of 70 miles per hour, the selection platform 109 may select travel segments 803, 805, 807, and 809 with speed limit proximate to 70 miles per hour. Road segments with velocity level below 70 miles per hour are deemphasized. Subsequently, the selection platform 109 may render one or more representations (e.g., panning, highlighting, raising, expanding etc.) of the one or more selected travel segments. In another scenario, emphasizing on travel segments with higher speed level that corresponds to the speed of the vehicle 801 may also cause understating (e.g., blurring, lowering, thinning, etc.) of the one or more travel segments with lower speed limits. In one example embodiment, a vehicle travelling at a high speed in a highway is not really concerned about local roads, however when the vehicle slows down then the display can be flipped wherein local roads that corresponds to the speed of the vehicle may be presented.

Figure 9:
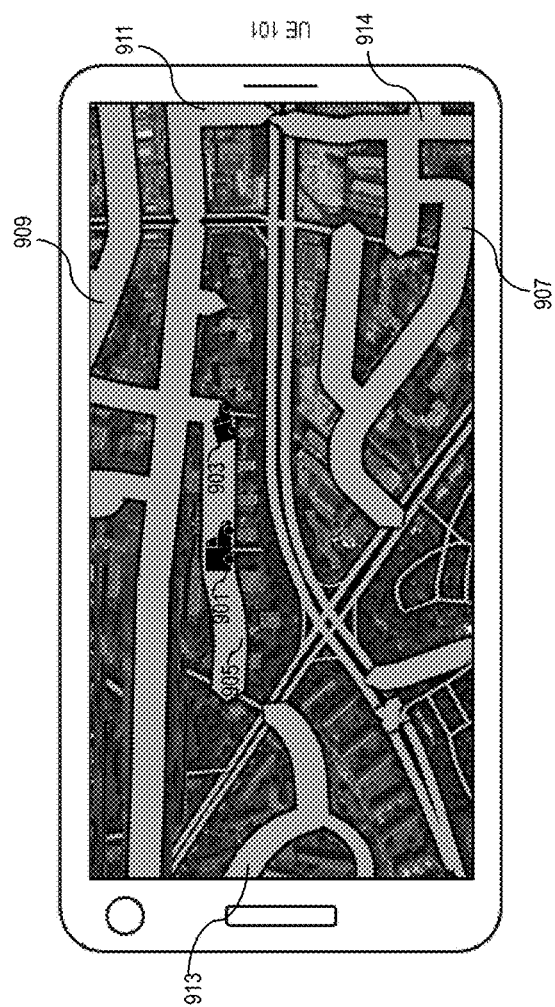
FIG. 9 is a user interface diagram that represents a scenario wherein travel segments with lower speed limits that conforms to the speed of at least one vehicle is displayed, according to one example embodiment.

FIG. 9 is a user interface diagram that represents a scenario wherein travel segments with lower speed limits that conforms to the speed of at least one vehicle is displayed, according to one example embodiment. In one scenario, the selection platform 109 may determine current speed for one or more vehicles 901 and 903. The vehicles 901 and 903 may be travelling at a considerably slow speed. For example, the vehicles 901 and 903 may be travelling north at a pace of 30 miles per hour to abide by the speed limit restriction in the lower level road segment 905. Then, the selection platform 109 may filter one or more travel segments with speed limit of 30 miles per hour. Subsequently, the selection platform 109 may render one or more representations (e.g., panning, highlighting, raising, expanding etc.) of the one or more selected travel segments 907, 909, 911, 913 and 914. In another scenario, emphasizing on travel segments with lower speed level that corresponds to the speed of the vehicles 901 and 903 may also cause fading-out of irrelevant travel segments.

The processes described herein for providing comprehensible representation of travel segments based, at least in part, on velocity information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
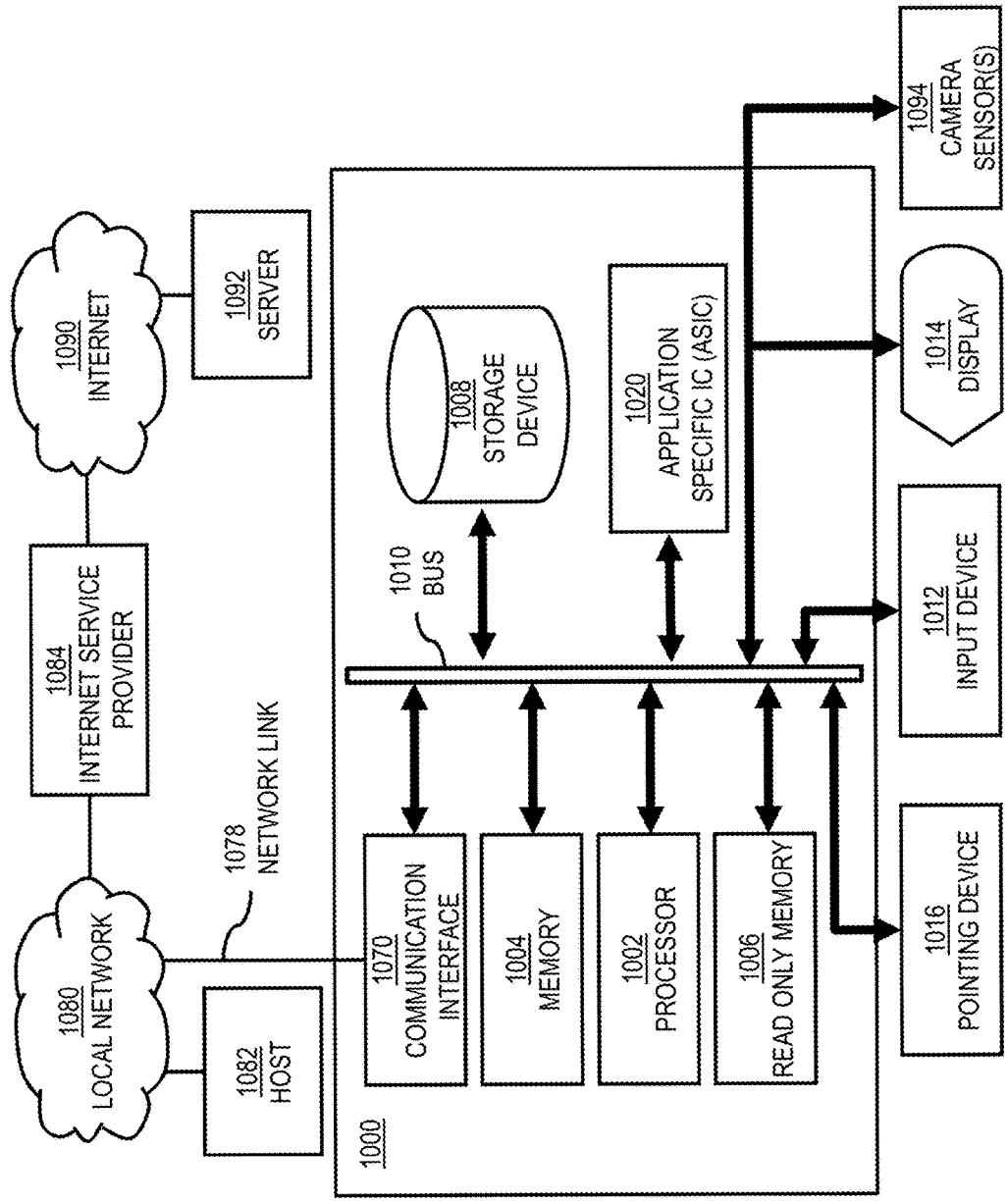
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide comprehensible representation of travel segments based, at least in part, on velocity information as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing comprehensible representation of travel segments based, at least in part, on velocity information.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to provide comprehensible representation of travel segments based, at least in part, on velocity information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for providing comprehensible representation of travel segments based, at least in part, on velocity information. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing comprehensible representation of travel segments based, at least in part, on velocity information, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for providing comprehensible representation of travel segments based, at least in part, on velocity information to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide comprehensible representation of travel segments based, at least in part, on velocity information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing comprehensible representation of travel segments based, at least in part, on velocity information.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide comprehensible representation of travel segments based, at least in part, on velocity information. The memory 1105 also stores the data associated with or generated by the execution of the inventive steps.

Figure 12:
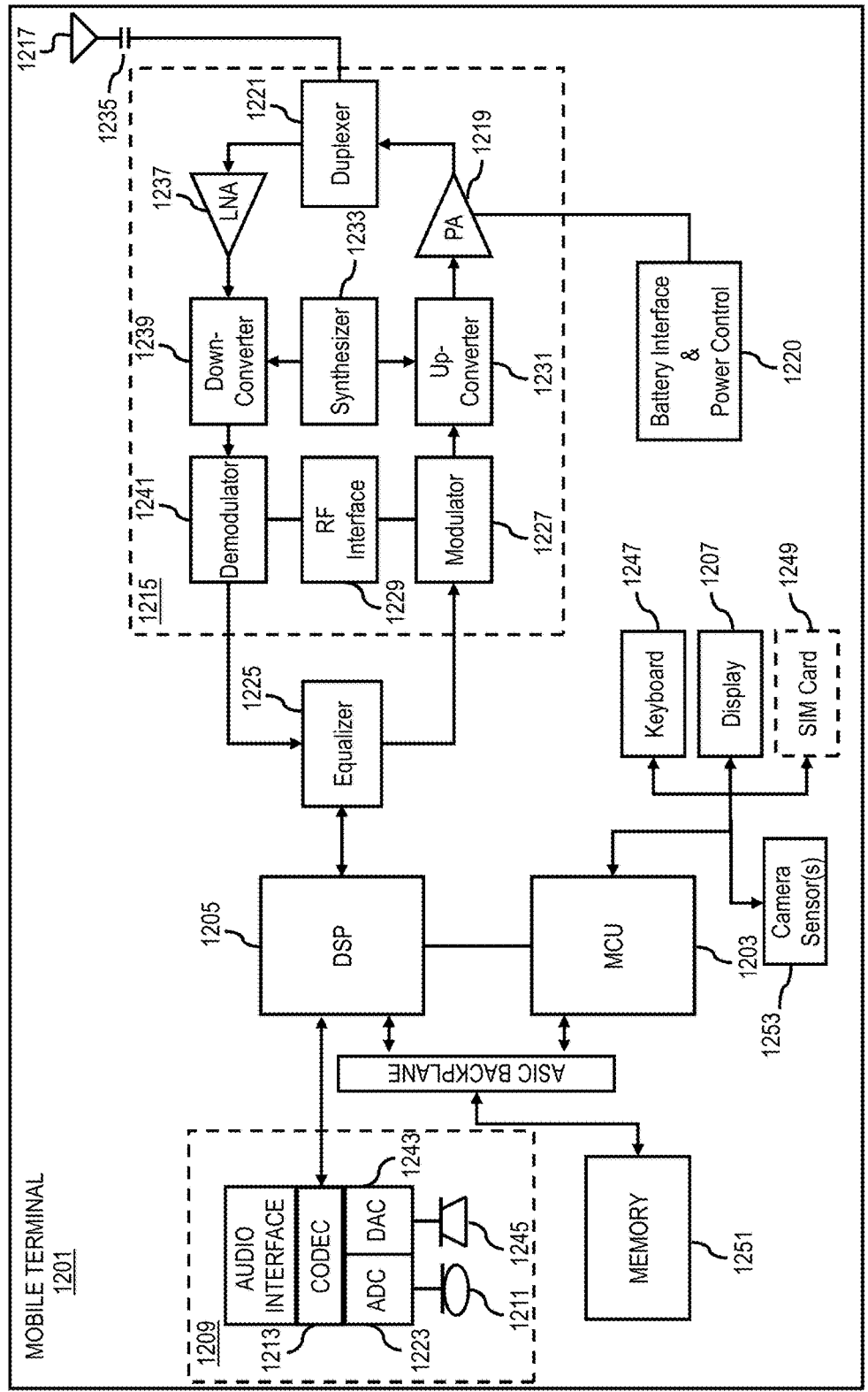
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing comprehensible representation of travel segments based, at least in part, on velocity information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing comprehensible representation of travel segments based, at least in part, on velocity information. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide comprehensible representation of travel segments based, at least in part, on velocity information. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of providing a map display on a mobile device based on velocity information, comprising:
  determining, by an apparatus, a route to a destination;
  determining, by the apparatus, a current velocity of a vehicle travelling on the route as a velocity threshold for a user of the mobile device travelling with the vehicle;
  filtering, by the apparatus, travel segments depicted in a mapping user interface on the mobile device to determine one or more of the travel segments having a real-time average traffic velocity matching the velocity threshold, wherein the one or more of the travel segments are not on the route; and
  initiating, by the apparatus, an update of the mapping user interface to depict one or more highlighted representations of the one or more of the travel segments matching the velocity threshold.

2. The method of claim 1, further comprising:
  routing the vehicle via the one or more of the travel segments matching the velocity threshold,
  wherein the one or more travel segments are filtered by real-time average velocity information.

3. The method of claim 1, wherein the one or more of the travel segments are further filtered using one or more vehicle capabilities, one or more driver's behaviors, or a combination thereof, and the method further comprising:
  determining subsequent travel segments that best fit the one or more vehicle capabilities,
    one or more driver's behaviors, or a combination thereof, to route the vehicle.

4. The method of claim 1, wherein the one or more travel segments are highlighted by raising and expanding the one or more representations of the one or more of the travel segments in the mapping user interface.

5. The method of claim 1, wherein velocity threshold relates to the velocity information for the vehicle as determined, in part, by the mobile device.

6. The method of claim 1, further comprising:
matching the current velocity of the vehicle with the one or more of the travel segments using speed limit information for the corresponding travel segments; and
selecting at least one travel segment based, at least in part, on the matching.

7. The method of claim 6, further comprising:
determining, at least in part, an input by the user for specifying the one or more representations over the mapping user interface,
wherein the input includes the matched velocity information.

8. The method of claim 1, further comprising:
determining one or more current driving conditions for the classifying of the one or more travel segments, wherein the current driving conditions include one or more travel segments physical dimensions;
filtering the one or more of the travel segments depicted in the mapping user interface based on physical dimensions of a currently travel segment travelled by the vehicle; and
initiating another update of the mapping user interface to depict one or more highlighted representations of one or more of the travel segments matching the physical dimensions.

9. The method of claim 1, further comprising:
determining proximity information for the vehicle, at the mobile device associated with the at least one vehicle, with respect to the one or more travel segments;
processing the proximity information to determine one or more proximate travel segments that are within at least one threshold boundary from the mobile device; and
causing one or more representations for the one or more proximate travel segments on the mapping user interface.

10. The method of claim 1, further comprising:
determining contextual information for the mobile device with respect to the one or more travel segments;
determining historical activity information for the mobile device with respect to the one or more travel segments;
processing the contextual information or the historical activity data to determine at least one predicted travel segment; and
causing one or more representations for the at least one predicted travel segment on the mapping user interface.

11. An apparatus of providing a map display on a mobile device based on velocity information, comprising:
at least one processor; and
at least one memory including computer program code for one or more programs,
the at least one memory and the computer program code configured to, with the at least one processor, cause the apparatus to perform at least the following:
determine a route to a destination;
determining a current velocity of a vehicle travelling on the route as a velocity threshold for a user of the mobile device travelling with the vehicle;
filtering travel segments depicted in a mapping user interface on the mobile device to determine one or more of the travel segments having a real-time average traffic velocity matching the velocity threshold, wherein the one or more of the travel segments are not on the route; and
initiating an update of the mapping user interface to depict one or more highlighted representations of the one or more of the travel segments matching the velocity threshold.

12. The apparatus of claim 11,
wherein the one or more travel segments are filtered by real-time average velocity information.

13. The apparatus of claim 11, wherein the one or more of the travel segments are further filtered using vehicle capability information.

14. The apparatus of claim 11, wherein the one or more of the travel segments are highlighted by raising and expanding the one or more representations of the one or more of the travel segments in the mapping user interface.

15. The apparatus of claim 11, wherein the velocity threshold is determined, in part, by the mobile device.

16. The apparatus of claim 11, wherein the apparatus is further caused to perform:
matching the current velocity of the vehicle with the one or more of the travel segments using speed limit information for the corresponding travel segments; and
selecting at least one travel segment based, at least in part, on the matching.

17. The apparatus of claim 16, wherein the apparatus is further caused to perform:
determining, at least in part, an input by the user for specifying the one or more representations over the mapping user interface,
wherein the input includes the matched velocity information.

18. A non-transitory computer-readable storage medium, for providing a map display on a mobile device based on velocity information, carrying one or more sequences of one or more instructions which, when executed by one or more processors, cause an apparatus to at least perform the following steps:
determining a route to a destination;
determining a current velocity of a vehicle travelling on the route as a velocity threshold for a user of the mobile device travelling with the vehicle; filtering travel segments depicted in a mapping user interface on the mobile device to determine one or more of the travel segments having a real-time average traffic velocity matching the velocity threshold, wherein the one or more of the travel segments are not on the route; and
initiating an update of the mapping user interface to depict one or more highlighted representations of the one or more of the travel segments matching the velocity threshold.

19. The non-transitory computer-readable storage medium of claim 18,
wherein the one or more travel segments are filtered by real-time average velocity information.

20. The non-transitory computer-readable storage medium of claim 18,
wherein the one or more of the travel segments are further filtered using vehicle capability information.

21. The method of claim 1, wherein the mobile device is a mobile terminal.

22. The method of claim 21, wherein the apparatus is embedded in the mobile device.

23. The method of claim 1, wherein the apparatus is embedded in a server located remotely from the vehicle.

* * * * *